United States Patent [19]

Ward

[11] Patent Number: 4,528,097

[45] Date of Patent: Jul. 9, 1985

[54] SYMMETRICAL FLUID FILTER APPARATUS WITH MULTIFACETED BEADS

[76] Inventor: Raymond E. Ward, 1905 N. Val Vista, Mesa, Ariz. 85205

[21] Appl. No.: 430,799

[22] Filed: Sep. 30, 1982

[51] Int. Cl.³ .............................................. B01D 35/24
[52] U.S. Cl. .................................. 210/353; 210/355; 210/453; 209/381
[58] Field of Search ................. 210/287, 416.3, 435, 210/446, 447, 451, 453, 454, 353, 505, 354, 355; 209/381, 382

[56] References Cited

U.S. PATENT DOCUMENTS

| | | | |
|---|---|---|---|
| 497,388 | 5/1893 | Ross | 210/164 |
| 1,296,685 | 3/1919 | Moore | 210/353 |
| 1,367,324 | 2/1921 | Probst | 210/287 |
| 1,766,621 | 6/1930 | Fleming | 210/239 |
| 1,960,806 | 5/1934 | Cohen | 210/163 |
| 2,119,923 | 6/1938 | McIntyre | 210/164 |
| 2,576,353 | 11/1951 | Nelson | 404/25 |
| 2,889,928 | 6/1959 | Sisk | 210/163 |
| 3,169,112 | 2/1965 | Nelson | 210/446 |
| 3,395,802 | 8/1968 | Rosaen | 210/446 |
| 3,425,562 | 2/1969 | Hamer | 210/353 |
| 3,471,261 | 10/1969 | Patterson | 210/287 |
| 3,552,574 | 1/1971 | Lowe | 210/353 |
| 3,715,870 | 2/1973 | Guzick | 210/446 |
| 3,732,985 | 5/1973 | Murrell | 210/446 |
| 3,778,366 | 12/1973 | Kraus | 210/353 |
| 3,891,337 | 6/1975 | McCoy | 404/26 |
| 4,039,452 | 8/1977 | Fernandez | 210/106 |
| 4,136,010 | 1/1979 | Pilié et al. | 404/25 |
| 4,200,531 | 4/1980 | Vanagi | 210/353 |
| 4,203,686 | 5/1980 | Bowman | 210/164 |
| 4,261,828 | 4/1981 | Brunner et al. | 210/287 |

FOREIGN PATENT DOCUMENTS

| | | | |
|---|---|---|---|
| 258974 | 8/1963 | Australia | 210/164 |
| 684809 | 4/1964 | Canada | 210/287 |
| 2821724 | 11/1979 | Fed. Rep. of Germany | 210/164 |
| 377743 | 9/1907 | France | 210/287 |
| 661910 | 7/1929 | France | 404/25 |
| 994982 | 11/1951 | France | 210/287 |
| 2256990 | 9/1975 | France | 404/4 |
| 102164 | 7/1941 | Sweden | 210/164 |
| 2080355 | 2/1982 | United Kingdom | 210/163 |

*Primary Examiner*—Richard V. Fisher
*Assistant Examiner*—Wanda L. M. Millard
*Attorney, Agent, or Firm*—Weiss & Holloway

[57] ABSTRACT

A filter apparatus for removing contaminants from a fluid comprises a cylindrical body and first and second caps coupled to first and second ends of the cylindrical body. Each of the caps has an aperture therein for the flow of fluid therethrough and first and second filters are positioned within said first and second caps respectively such that a filter medium is housed within said cylindrical body and restrained by said first and second filters. The first and second filters are continuously cleaned by impinging multifaceted beads. The filter apparatus is entirely symmetrical and either the first or second cap may serve as an inlet cap while the other cap serves as an outlet.

1 Claim, 3 Drawing Figures

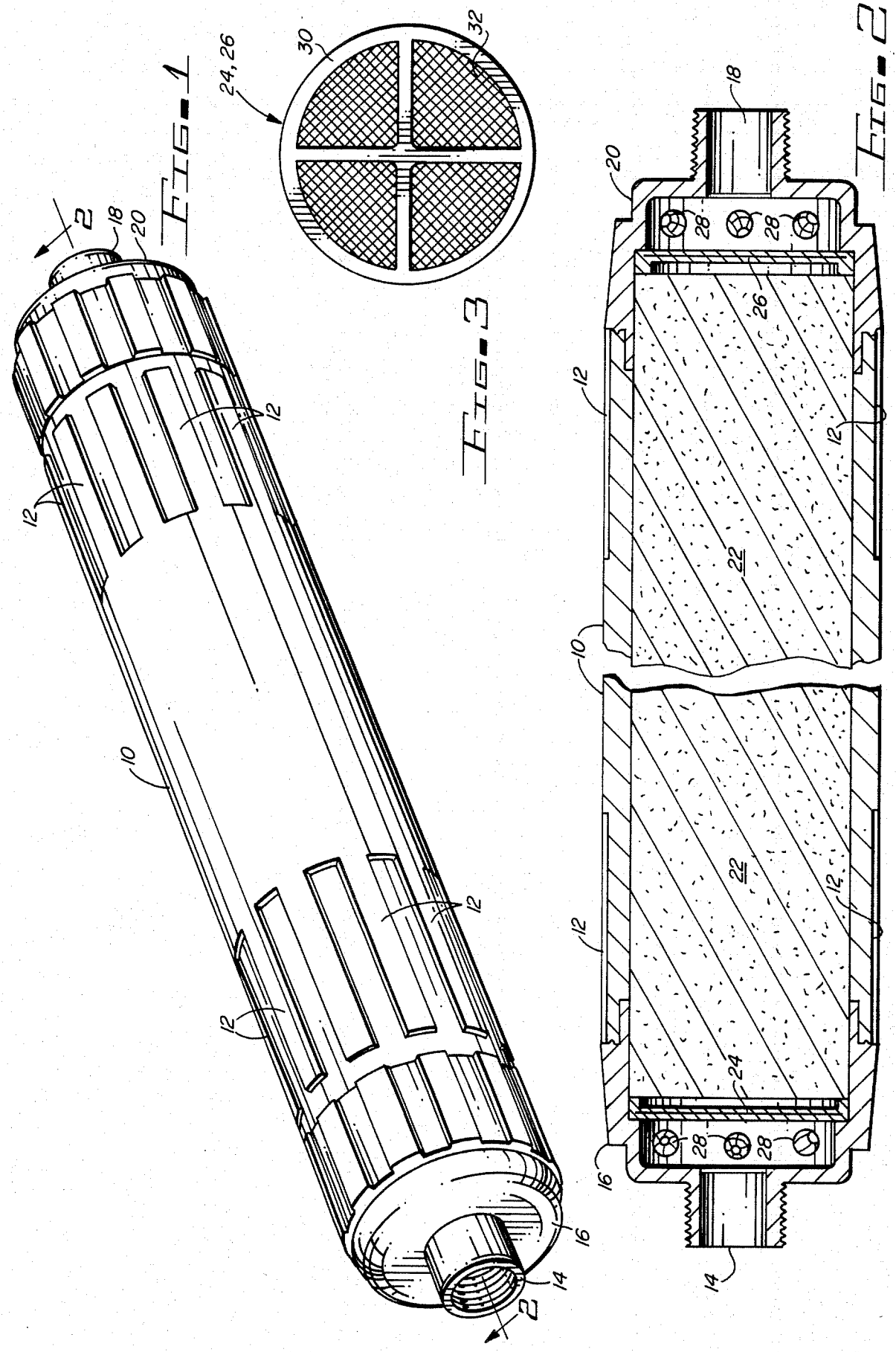

SYMMETRICAL FLUID FILTER APPARATUS WITH MULTIFACETED BEADS

BACKGROUND OF THE INVENTION

This invention relates generally to a fluid filter and, more particularly, to a water filter apparatus which is symmetrical; i.e. having an inlet and an outlet which are interchangeble.

Various devices have been developed for the purpose of removing contaminants from water. A common problem among such filters is that after a period of use, the filter, in particular the filter inlet surface, tends to become clogged with contaminants removed from the flow. Thus, it was felt that a need existed for an apparatus which would keep the inlet surface of a filter apparatus free of contaminants. The inventor's copending Application Ser. No. 195,790, filed Oct. 10, 1980, involves a filtering apparatus wherein the flow causes one or more multi-faceted bead members to circulate throughout and to impinge upon every surface of an inlet chamber so as to dislodge comtaminants which have accumulated on the filter inlet surface portion of the inlet chamber.

SUMMARY OF THE INVENTION

It is an object of the present invention to provide an improved fluid filtering apparatus.

It is a further object of the present invention to provide an improved filtering apparatus which is symmetrical; i.e. the inlet and outlet are interchangeable.

According to a broad aspect of the invention there is provided a filter apparatus for removing contaminants from a flow of fluid, comprising: a cylindrical body; a first cap having a first aperture therein coupled to one end of said cylindrical body; a second cap having a second aperture therein coupled to a second end of said body; and filter means disposed within said cylindrical body and restrained by said first and second caps for filtering said fluid, said apparatus being symmetrical such that said fluid may flow in either direction through said apparatus.

The above, and other objects features and advantages of the present invention will be more clearly understood from the following detailed description taken in conjunction with accompanying drawings, in which:

BRIEF DESCRIPTION OF THE DRAWINGS

FIG. 1 is a perspective view of the water filter apparatus of the present invention;

FIG. 2 is a cross-sectional view of the water filter apparatus shown in FIG. 1; and FIG. 3 is a plan view of the inlet or outlet filter employed in the apparatus shown in FIGS. 1 and 2.

DESCRIPTION OF THE PREFERRED EMBODIMENT

Referring to FIG. 1, the inventive filter apparatus is provided with an inlet cap 16 having an inlet 14 which may be coupled to a source of unfiltered fluid, such as a diverter valve attached to the spigot of a water faucet. The apparatus is also provided with an outlet cap 20 having outlet 18 therein at which filtered fluid is available. Inlet cap 16 and outlet cap 20 are positioned at opposite ends of a main body 10 having ribs 12 thereon.

FIG. 2 is a cross-sectional view of the apparatus shown in FIG. 1. The filter apparatus is provided with an inlet filter 24 for straining contaminants from the fluid flow. As can be seen from FIG. 3, the inlet filter is comprised of a rigid frame 30 which provides structural support for a woven micronic filter element 32.

While inlet filter 24 is positioned within inlet cap 16 and abuts thereagainst, a similar filter (an outlet filter) 26 is positioned within outlet cap 20. A bed of filter material 22 is contained within main body 10. The inlet and outlet filters 24 and 26 respectively retain filter bed 22 within body 10.

Within both inlet cap 16 and outlet cap 20 a chamber is formed between inlet and outlet filters 24 and 26 respectively and inlet and outlet 14 and 18 respectively. Each of these chambers contains at least one multifaceted mobile member or bead 28 for impinging upon the outer surfaces of filters 24 and 26 so as to prevent accumulation of contaminants on the filter.

Each of mobile members 28, as stated previously, is provided with a plurality of facets on the surface. Each of the facets meet at edges and corners so that when exposed to even a very moderate flow of fluid, the mobile member 28 tends to tumble about its own edges and corners. Mobile member 28 is preferably fabricated from material having a density incrementally greater than that of the fluid. Of course, the size of mobile member 28 is a function of the fluid being filtered and the contaminants being removed. Typically, they may be 6 to 8 millimeters in nominal diameter.

As is apparent from FIG. 2, both inlet 14 and outlet 18 are externally threaded so as to easily accomodate a pipe or hose. It should be more apparent, however, that the device shown in FIGS. 1 and 2 is completely symmetrical. That is, the roles of inlet 14 and outlet 18 may be reversed and the device will still function to remove contaminants from the water. It is for this reason that filters 24 and 26 and multifaceted beads 28 are placed in inlet and outlet caps 16 and 20. Of course, by reversing the direction of flow through the device, inlet cap 16 becomes an outlet cap and inlet 14 becomes an outlet. Similarly, outlet cap 20 is now the inlet cap and outlet 18 functions as the fluid inlet.

The apparatus described above and shown in FIGS. 1 and 2 is symmetrical and its orientation within a fluid flow may be reversed. This not only adds versatility and flexibility to the over-all system but also increases the life of the filter. After a period of years in a first orientation, the coupling and recoupling in a reverse orientation will assist in removing contaminants from the filters and result in greater filtering efficiency.

The above description is given by way of example only. Changes in forms and details may be made by one skilled in the art without departing from the spirit and scope of the present invention as defined by the appended claims.

What is claimed is:

1. A filter apparatus for removing contaminants from a flow of fluid, comprising:
   a cylindrical body;
   a first cap having a first aperture therein coupled to one end of said cylindrical body, said first cap being equipped with external thread means surrounding said first aperture for coupling said filter apparatus into a fluid flow line;
   a second cap having a second aperture therein coupled to a second end of said cylindrical body, said second cap being equipped with external thread means surrounding said second aperture for coupling said filter apparatus into a second fluid flow line;

filter means disposed within said cylindrical body and restrained by said first and second caps for filtering said fluid, said filter apparatus being symmetrical so that said fluid may flow in either direction through said filter apparatus, the orientation of said filter means being capable of being reversed for assisting in removing contaminants and producing greater filter efficiency in order to substantially extend the life of said filter apparatus, said filter means comprising a first filter operably positioned within said first cap for forming a first filter chamber, a second filter operably positioned within said second cap for forming a second filter chamber, said first and second filter chambers being symmetrically interchangeable for allowing reverse operation of said filter apparatus, and a filter medium operably positioned between said first and second filters and constrained within said cylindrical body between said first and second filters and the intercylindrical wall of said cylindrical body, each of said first and second filters including a rigid frame in order to provide support for a woven micronic filter element;

first cleaning means operably disposed within said first filter chamber and including at least one first mobile multifaceted bead means for providing multiple corners for both increased tumbling action and for impinging on the outer surface of said first filter under a very moderate flow of fluid to prevent the accumulation of contaminants thereon while said first aperture serves as both an inlet and an outlet for said filter apparatus, each of said at least one first mobile multifaceted bead means being constrained within said first filter chamber, each of said at least one first mobile multifaceted bead means being formed from a material having a density incrementally greater than that of the fluid being filtered;

second cleaning means operably disposed within said second filter chamber and including at least one second mobile multifaceted bead means for providing multiple corners for both increased tumbling action and for impinging on the outer surface of said second filter under a very moderate flow of fluid to prevent the accumulation of contaminants thereon while said second aperture serves as both an inlet and an outlet for said filter apparatus, each of said at least one second mobile multifaceted bead means being constrained within said second filter chamber, each of said at least one second mobile multifaceted bead means being formed from a material having a density incrementally greater than that of the fluid being filtered; and each of said at least one first and second mobile multifaceted bead means having more than six facets.

* * * * *